(12) United States Patent
Holloway

(10) Patent No.: US 8,543,929 B1
(45) Date of Patent: Sep. 24, 2013

(54) USER RATINGS ALLOWING ACCESS TO FEATURES FOR MODIFYING CONTENT

(75) Inventor: David Cloudesley Holloway, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1243 days.

(21) Appl. No.: 12/120,563

(22) Filed: May 14, 2008

(51) Int. Cl.
 *G06F 3/048* (2006.01)

(52) U.S. Cl.
 USPC .......................................................... 715/757

(58) Field of Classification Search
 USPC ................................................. 715/751, 757
 See application file for complete search history.

(56) References Cited

U.S. PATENT DOCUMENTS

| | | | | |
|---|---|---|---|---|
| 6,052,723 | A * | 4/2000 | Ginn .............................. | 709/223 |
| 6,336,133 | B1 * | 1/2002 | Morris et al. .................. | 709/204 |
| 6,691,155 | B2 | 2/2004 | Gottfried | |
| 6,735,701 | B1 * | 5/2004 | Jacobson ........................... | 726/1 |
| 6,884,163 | B2 * | 4/2005 | Namba et al. ..................... | 463/1 |
| 7,181,438 | B1 * | 2/2007 | Szabo .................................. | 1/1 |
| 7,192,344 | B2 * | 3/2007 | Baerlocher ...................... | 463/16 |
| 7,346,848 | B1 * | 3/2008 | Ruthfield et al. ............. | 715/749 |
| 7,562,304 | B2 * | 7/2009 | Dixon et al. ................... | 715/738 |
| 2002/0013815 | A1 * | 1/2002 | Obradovich et al. ......... | 709/204 |
| 2002/0049788 | A1 * | 4/2002 | Lipkin et al. .................. | 707/513 |
| 2002/0065848 | A1 * | 5/2002 | Walker et al. ................. | 707/511 |
| 2002/0193162 | A1 * | 12/2002 | Walker et al. .................. | 463/42 |
| 2003/0001793 | A1 * | 1/2003 | Brin .............................. | 345/753 |
| 2003/0179230 | A1 * | 9/2003 | Seidman ....................... | 345/750 |
| 2003/0182177 | A1 * | 9/2003 | Gallagher et al. ............. | 705/10 |
| 2004/0001086 | A1 * | 1/2004 | Brown et al. ................. | 345/744 |
| 2004/0109031 | A1 * | 6/2004 | Deaton et al. ................. | 345/848 |
| 2004/0135820 | A1 * | 7/2004 | Deaton et al. ................. | 345/848 |
| 2004/0225387 | A1 * | 11/2004 | Smith, III ....................... | 700/92 |
| 2005/0198574 | A1 * | 9/2005 | Lamkin et al. ................ | 715/719 |
| 2006/0042483 | A1 * | 3/2006 | Work et al. ..................... | 101/91 |
| 2006/0075055 | A1 * | 4/2006 | Littlefield ..................... | 709/206 |
| 2006/0139322 | A1 * | 6/2006 | Marks ........................... | 345/156 |
| 2006/0253581 | A1 * | 11/2006 | Dixon et al. .................. | 709/225 |
| 2007/0038559 | A1 * | 2/2007 | Jung et al. ....................... | 705/39 |
| 2007/0129126 | A1 * | 6/2007 | Van Luchene .................... | 463/1 |
| 2007/0219815 | A1 * | 9/2007 | Robinson et al. ................. | 705/1 |
| 2008/0046925 | A1 * | 2/2008 | Lee et al. ......................... | 725/37 |
| 2008/0091771 | A1 * | 4/2008 | Allen et al. .................... | 709/203 |
| 2008/0092065 | A1 * | 4/2008 | Jung et al. ..................... | 715/757 |

(Continued)

OTHER PUBLICATIONS

Hof, "My Virtual Life," BusinessWeek, May 1, 2006.*

(Continued)

*Primary Examiner* — Matt Kim
*Assistant Examiner* — Ryan Barrett
(74) *Attorney, Agent, or Firm* — Kilpatrick Townsend & Stockton LLP

(57) ABSTRACT

Methods and apparatus provide for a Virtual Environment that receives content associated with a first user and stores the content for presentation to a second user. When the second user accesses the virtual community, the Virtual Environment transmits the content for display of the content to the second user. The Virtual Environment receives data (e.g. ratings, feedback) associated with the content from the second user(s). The Virtual Environment processes the received data from the second user in order to determine an amount of reward for the first user. The Virtual Environment allows the first user to use the amount of reward (e.g. virtual money) towards obtaining one or more features that allow the first user to modifying the content.

17 Claims, 10 Drawing Sheets

(56) References Cited

U.S. PATENT DOCUMENTS

| | | | |
|---|---|---|---|
| 2008/0229215 A1* | 9/2008 | Baron et al. | 715/751 |
| 2008/0235746 A1* | 9/2008 | Peters et al. | 725/111 |
| 2008/0244461 A1* | 10/2008 | Kropivny | 715/856 |
| 2008/0263449 A1* | 10/2008 | Schwartz et al. | 715/723 |
| 2008/0268418 A1* | 10/2008 | Tashner et al. | 434/365 |
| 2008/0288494 A1* | 11/2008 | Brogger et al. | 707/7 |
| 2009/0019402 A1* | 1/2009 | Ke et al. | 715/849 |
| 2009/0043907 A1* | 2/2009 | Peterson et al. | 709/231 |
| 2009/0044113 A1* | 2/2009 | Jones et al. | 715/707 |
| 2009/0063995 A1* | 3/2009 | Baron et al. | 715/753 |
| 2009/0070286 A1* | 3/2009 | Liss et al. | 707/1 |
| 2009/0070665 A1* | 3/2009 | Chijiiwa et al. | 715/235 |
| 2009/0070684 A1* | 3/2009 | Aldrich et al. | 715/743 |
| 2009/0083637 A1* | 3/2009 | Skakkebaek et al. | 715/751 |
| 2009/0100354 A1* | 4/2009 | Jung et al. | 715/757 |
| 2009/0106673 A1* | 4/2009 | Jung et al. | 715/757 |
| 2009/0113314 A1* | 4/2009 | Dawson et al. | 715/757 |
| 2009/0138355 A1* | 5/2009 | Jung et al. | 705/14 |
| 2009/0144639 A1* | 6/2009 | Nims et al. | 715/757 |
| 2009/0158220 A1* | 6/2009 | Zalewski et al. | 715/863 |
| 2009/0164918 A1* | 6/2009 | Bates et al. | 715/757 |
| 2009/0204907 A1* | 8/2009 | Finn et al. | 715/757 |

OTHER PUBLICATIONS

Greuter et al., "Real-time Procedural Generation of 'Pseudo Infinite' Cities," RMIT University, 2003.*

Entropia Directory, "Decay" page, Apr. 8, 2006, http://replay.waybackmachine.org/20070213005423/http://www.entropiadirectory.com/wiki/Decay.*

Yohoho! Puzzle Pirates, Dec. 16, 2007, http://replay.waybackmachine.org/20071226230451/http://en.wikipedia.org/wiki/Yohoho!_Puzzle_Pirates.*

Hemp, "Avatar-Based Marketing," Harvard Business Review, Jun. 2006.*

Richard A. Bartle, "Pitfalls of Virtual Property," The Themis Group, Apr. 2004.*

Zachary B. Simpson, "The In-game Economics of Ultima Online," Computer Game Developer's Conference, Mar. 2002.*

"Virtual Economy," Feb. 27, 2008, http://en.wikipedia.org/wiki/Virtual_economy.*

"Gold Sink," Feb. 25, 2008, http://en.wikipedia.org/wiki/Gold_sink.*

Webster's Ninth New Collegiate Dictionary, Merriam-Webster, Inc., 1991.*

Slashdot FAQ, Aug. 28, 2005, http://web.archive.org/web/20050828143447/http://slashdot.org/faq.*

* cited by examiner

USER RATINGS ALLOWING ACCESS TO FEATURES FOR MODIFYING CONTENT

BACKGROUND

A virtual community is a social network of online users, with a common interest, idea, task or goal, that interact in a computer generated virtual society across time, geographical and organizational boundaries. Different virtual communities have different levels of interaction and participation among their users. The different levels of interaction and participation among users range from, for example, adding comments to a community message board, or multiple users simultaneously competing against each other in an online video game.

An early example of a virtual community is an online chat room. An online chat room allows multiple users to communicate by sending text messages to users logged in to the same chat-room in real-time. Some chat rooms use both text and voice simultaneously. There are also graphical user interface (GUI) text-based chat rooms which allow users to select an identifying icon and modify the look of their chat Environment.

As the notion of a virtual community has advanced along with technological capability, virtual worlds have been created. A virtual world is a computer-based simulated Environment intended for multiple users to inhabit and interact via avatars. These avatars are usually depicted as textual, two-dimensional, or three-dimensional graphical representations of the users themselves, although other forms are possible (auditory and touch sensations for example). When a user logs onto a virtual world, the user's client computer accesses the computer-simulated world and presents perceptual stimuli to the user, who in turn can manipulate elements of the modeled world and thus experiences telepresence to a certain degree. Such modeled worlds may appear similar to the real world or instead depict fantasy worlds. Communication between users has ranged from text, graphical icons, visual gesture, sound, and rarely, forms using touch and balance senses. Massive multiplayer online games commonly depict a world similar to the real world, with real world rules and real-time actions, and communication. Communication is usually textual, with real-time voice communication using VOIP also possible.

Examples of conventional systems can be found at www.graffitiwall.com, U.S. Pat. No. 6,691,155, http://www-.drawball.com/, and virtual worlds (e.g. second life) and massively multiplayer online games (e.g. World of Warcraft).

SUMMARY

Current conventional virtual communities suffer from a variety of deficiencies. Specifically, in an online community that allows a user to post content, there is no way to motivate users to post content that is pleasing to the tastes of the community as a whole. For example, if a user posts a message to an online bulletin board system, other user's can create response threads to that user's message if they want to elaborate on the subject of the message. If many users add to the response thread, then the original poster can edit his original message or submit an entirely new message to continue his original thought. However, the ability to edit a previously posted message or to submit a new message is not a privilege that the original poster has earned due to the popularity of his original message. Rather, any user, regardless of how the other users in the community feel about that user's posted messages, can edit old messages or submit new messages.

In the alternative, if a user finds another user's posted message offensive, the user can flag that message—which will most likely result in a community administrator removing the flagged message. Such removal of flagged messages is deficient because it allows a small minority of users in the virtual community to effect total removal of a flagged message while a large majority of users may actually find the flagged message acceptable.

Techniques discussed herein significantly overcome the deficiencies of conventional applications such as those discussed above as well as additional techniques also known in the prior art. As will be discussed further, certain specific embodiments herein are directed to a Virtual Content Presentation Environment. The one or more embodiments of the Virtual Environment as described herein contrast with conventional systems to reward users for submitting content that is pleasing to multiple users in a virtual community. If a user submits content to a virtual community that eventually becomes highly-rated by other users in the virtual community, the Virtual Environment will reward the user who posted the content with an option to access features that allow the user to modify, enhance, and/or preserve the content. Such features are not available to the users of the virtual community unless their content receives a threshold amount of approval ratings from other users in the virtual community.

For example, the Virtual Environment can support a virtual community that includes a self-extending coordinate map upon which multiple users can post (or create) content, such as graphical designs, website addresses, slogans, and media. The self-extending coordinate map is "self-extending" because as any user encounters a current boundary of the self-extending coordinate map, the Virtual Environment adds a new portion to the self-extending coordinate map. Hence, the self-extending coordinate map is conceptually an infinite digital area in which users can endlessly browse and navigate.

Users can view content posted to (i.e. placed at) a location in the self-extending coordinate map by other users and can post their own content at any desired location—even over the content of other users. Once a user posts content to a location in the self-extending coordinate map, the Virtual Environment assigns a coordinate address for the posted content. Thus, other users will view that user's content when their browsing in the self-extending coordinate map reaches an area near the assigned coordinate address.

When a user posts content in the self-extending coordinate map, the content begins to slowly fade over time—much like paint's reaction to sunlight exposure in the real world. The Virtual Environment thereby applies a rate of decay to each piece of content from every user. For instance, if 'user A' posts a graffiti graphic at a location on the self-extending coordinate map at 1:00 p.m., the graffiti graphic will slowly begin to fade over time according to the rate of decay. In other words, the version of the graffiti graphic viewed by 'user B' at 11:00 p.m. is less visible (or less distinct) than the version of the graffiti graphic viewed by 'user C' at 5:00 p.m.

As users in the virtual community view the various decayed versions of the graffiti graphic at different times, they can select a rating for the graffiti graphic. Via the ratings, the users in the virtual community can communicate their approval, disapproval or ambivalence towards the graffiti graphic. The Virtual Environment processes all the ratings received from the users in the virtual community to create an aggregate rating for the graffiti graphic. For example, if a large percentage of the users in the virtual community give the graffiti graphic a rating of "cool" and a small percentage of users give the graffiti graphic a rating of "lame," then the aggregate rating for the graffiti graphic will trend towards an overall rating of "cool."

The Virtual Environment gives rewards to the user who posted the graffiti graphic based on the aggregate rating (or based on each individual rating from each user). The "cooler" the aggregating rating, the more rewards the user receives. Such rewards can be, for example, an amount of virtual money that the user can apply towards acquiring one or more features that allow him to modify the graffiti graphic. For example, the Virtual Environment can offer a feature that allows the user to slow the rate of decay applied to the graffiti graphic or to refresh the graffiti graphic so that it appears as though it was just posted on the self-extending coordinate map. Each feature can have its own price, which is paid for by the user who posted the graffiti graphic with the rewards (e.g. the virtual money). The user who posted the graffiti graphic can purchase another feature which prohibits other users from defacing the graffiti graphic for a period of time.

Over time, as multiple users post their own content on the self-extending coordinate map and rate the slowly decaying content from other users, those users whose content is most appreciated by the virtual community will be the most rewarded. The users who posted the most appreciated content will thereby have enough rewards (e.g. the virtual money) to access features to further enhance, preserve or modify their content. Hence, since they created content that satisfies the virtual community, the users who posted the most appreciated content gain the privilege of maintaining or further developing their content. However, those users whose content is not highly rated by other users will not obtain enough rewards to acquire features that allow them to preserve, enhance, or modify their poorly-rated content. Instead, their poorly rated content will simply fade away over time.

Thus, the rate of content decay adds an element of tension in the virtual community. The tension will motivate users who post content to be aware of the tastes, mood, and preferences of other users so that they will create content that will be highly rated—and thereby highly rewarded. Moreover, in order to learn about the tastes, mood, and preferences of the virtual community, a user will probably have to post content onto the self-extending coordinate map multiple times in order to learn what kind of content the users in the virtual community seem to like. Hence, the tension created by the rate of decay has the potential of creating a high degree of reuse of the self-extending coordinate map by each user—as each user strives to create content that results in higher approval ratings from the other users.

Specifically, in various embodiments, the Virtual Environment receives content associated with a first user and stores the content for presentation to a second user. When the second user accesses the virtual community, the Virtual Environment transmits the content for display of the content to the second user. The Virtual Environment receives data (e.g. ratings, feedback) associated with the content from the second user. The Virtual Environment processes the received data from the second user in order to determine an amount of reward for the first user. The Virtual Environment allows the first user to use the amount of reward towards obtaining one or more features that allow the first user to modifying the content.

In another embodiment, the Virtual Environment receives a rule suggestion from a user of the virtual community. The Virtual Environment allows other users to respond the rule suggestion by providing rule responses. The Virtual Environment receives a rule response from any user, which can be (i) an approval of the rule described in the rule suggestion, (ii) a disapproval of the rule described in the rule suggestion, or (iii) a modified rule based on the rule described in the rule suggestion. When the Virtual Environment receives a threshold amount of approvals for either the rule suggestion or the modified rule, the Virtual Environment creates a community rule that changes a required level of access to a feature (e.g. the price of a feature) that allows for modifying the content.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Virtual Content Presentation Environment, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
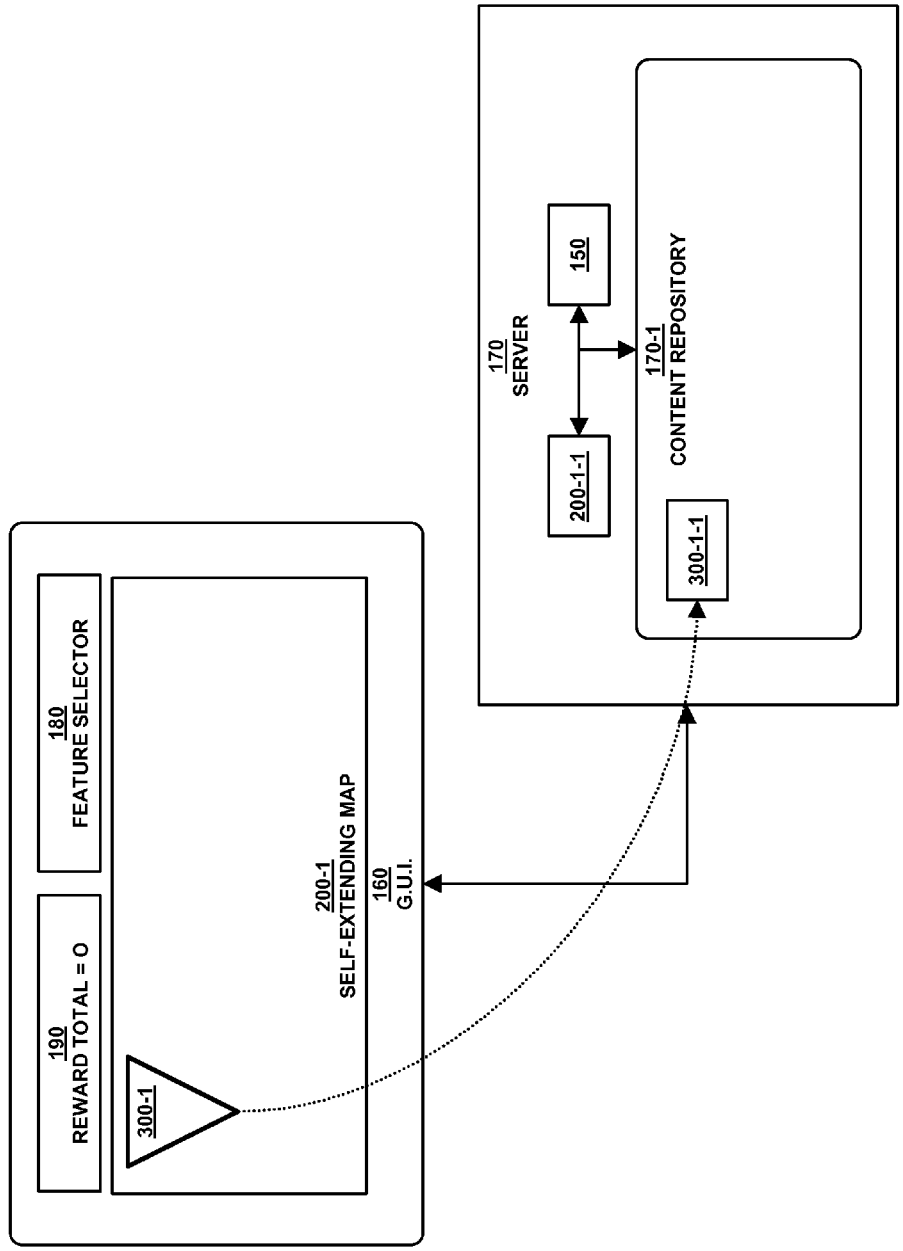
FIG. 1 is an example block diagram of a graphical user interface perspective view of a self-extending coordinate map where a user submits user-generated content to a location on a self-extending coordinate map according to embodiments herein.

Methods and apparatus provide for a Virtual Environment that receives content associated with a first user and stores the content for presentation to a second user. When the second user accesses the virtual community, the Virtual Environment transmits the content for display of the content to the second user. The Virtual Environment receives data (e.g. ratings, feedback) associated with the content from the second user. The Virtual Environment processes the received data from the second user in order to determine an amount of reward for the first user. The Virtual Environment allows the first user to use the amount of reward (e.g. virtual money) towards obtaining one or more features that allow the first user to modify the content.

In one embodiment, the Virtual Environment provides a self-extending coordinate map within a virtual community. The Virtual Environment allows multiple users to concurrently and/or consecutively access the virtual community to browse and navigate the self-extending coordinate map from their own respective client systems. In addition, each user can choose to create and submit content at any location in the self-extending coordinate map.

When a user submits content to a location in the self-extending coordinate map, the Virtual Environment receives the content and stores the content for presentation on the self-extending coordinate map to all active users in the virtual community. As time elapses from when the user created and/or submitted the content, the Virtual Environment continually creates and stores gradually fading versions of the content. The Virtual Environment thereby constantly updates the content to be displayed on the self-extending coordinate map with a most recent faded version of the content at the location where the user originally submitted the content. Thus, as multiple users access the virtual community at different times, each will view a different faded version of the content at the same location in the self-extending coordinate map.

Regardless of which faded version of the content the Virtual Environment transmits for display on the self-extending coordinate map, users can rate (i.e. provide feedback) the content upon viewing a current faded version of the content on the self-extending coordinate map. The Virtual Environment receives each rating from each user that chooses to rate the content.

Based on the received ratings, the Virtual Environment determines a reward amount (such as an amount of virtual money) for the user that created and submitted the content. The Virtual Environment allows the user to exchange a certain reward amount to obtain access to features that will allow the user to enhance, preserve, and/or modify the content. For example, the features can allow for (i) decreasing the rate at which the content fades (e.g. a rate of decay) for a certain amount of time, (ii) refreshing a current version of the content to create a new version of the content which represents the content without any fading, (iii) terminating the rate at which the content fades for a certain amount of time, and/or (iv) prohibiting the other users from modifying the current version of the content for a certain amount of time.

Referring to FIG. 1, FIG. 1 is an example block diagram of a graphical user interface 160 perspective view of an self-extending coordinate map 200-1 where a user submits user-generated content 300-1 to a location on a self-extending coordinate map 200-1 according to embodiments herein.

FIG. 1 illustrates a Virtual Environment 150 executing within a server system 170. The Virtual Environment 150 communicates with a content repository 170-1 that stores versions of content from multiple users. The server 170 also stores a current version 200-1-1 of a self-extending coordinate map 200-1. The Virtual Environment 150 transmits the stored current version 200-1-1 of the self-extending coordinate map 200-1 from the server 170 in order to create a graphical user interface 160 on a client system.

The graphical user interface 160 provides a user at the client system with a perspective view of the current version 200-1-1 of the self-extending coordinate map 200-1. The graphical user interface 160 displays a reward total 190 for the user and allows the user to select one or more features for modifying the user's content via a feature selector 180. However, in order to select a feature, the user must have a certain amount of rewards to qualify for a desired feature.

The Virtual Environment 150 receives user-generated content 300-1 from the user. The user-generated content 300-1 can be graphical, textual, a link to a location within the self-extending coordinate map 200-1, a link to a location in the virtual community 210, a link to a location outside the virtual community 210, a symbol, media (e.g. video, image, audio), a graffiti-type design or any combination thereof. Further, it is understood that the graphical user interface 160 created by the Virtual Environment 150 provides tools for creating, enhancing, and manipulating the user-generated content 300-1. For example, if the user-generated content 300-1 is a graffiti-style graphical design, the user can access tools via the graphical user interface 160 such as colors, spray paint effects, cut, copy, paste, and other tools that allow the user to create a graphical design. In another embodiment, if the user-generated content 300-1 is textual, like a poem or a slogan, the user can access tools via the graphical user interface 160 such as boldface, underline, copy, paste, edit, delete, italics, font, highlight and other tools that allow the user to enhance textual characteristics.

The Virtual Environment 150 defines the self-extending coordinate map 200-1 as a two-dimensional coordinate map that allows the user to select any location within the self-extending coordinate map 200-1 for placement of the user-generated content 300-1. The Virtual Environment 150 assigns the user-generated content 300-1 to a coordinate address on the self-extending coordinate map 200-1. The assigned coordinate address corresponds to the location for the user-generated content 300-1 selected by the user.

Upon receiving the user-generated content 300-1 from the user, the Virtual Environment 150 stores a current version 300-1-1 of the user-generated content 300-1. When a second user accesses and browses the self-extending coordinate map 200-1 from another client system, the Virtual Environment 150 can sends the current version 300-1-1 of the user-generated content 300-1 for presentation of the user-generated content 300-1 in a graphical user interface on the second user's client system. The second viewer thereby can view the user-generated content 300-1 at the location in the self-extending coordinate map 200-1 selected by the user who generated the content 300-1.

Further, the second user can navigate to a vertical edge (or horizontal edge) of the self-extending coordinate map 200-1. The Virtual Environment 150 detects the second user navigating up to a coordinate limit of the self-extending coordinate map 200-1. Since the user is at the coordinate limit of the self-extending coordinate map 200-1, the Virtual Environment 150 creates a new portion for the self-extending coordinate map 200-1—thereby adding new space within the self-extending coordinate map 200-1 for users to place their content. The Virtual Environment 150 stores an updated representation of the self-extending coordinate map so other users will see the new portion upon accessing the self-extending coordinate map.

It is therefore understood that as users navigate to any horizontal or vertical boundary of the self-extending coordinate map, the Virtual Environment 150 responds by creating additional portions for the self-extending coordinate map. Thus, the self-extending coordinate map can be implemented as a conceptually infinite digital space accessible to multiple users in a virtual community.

Figure 2:
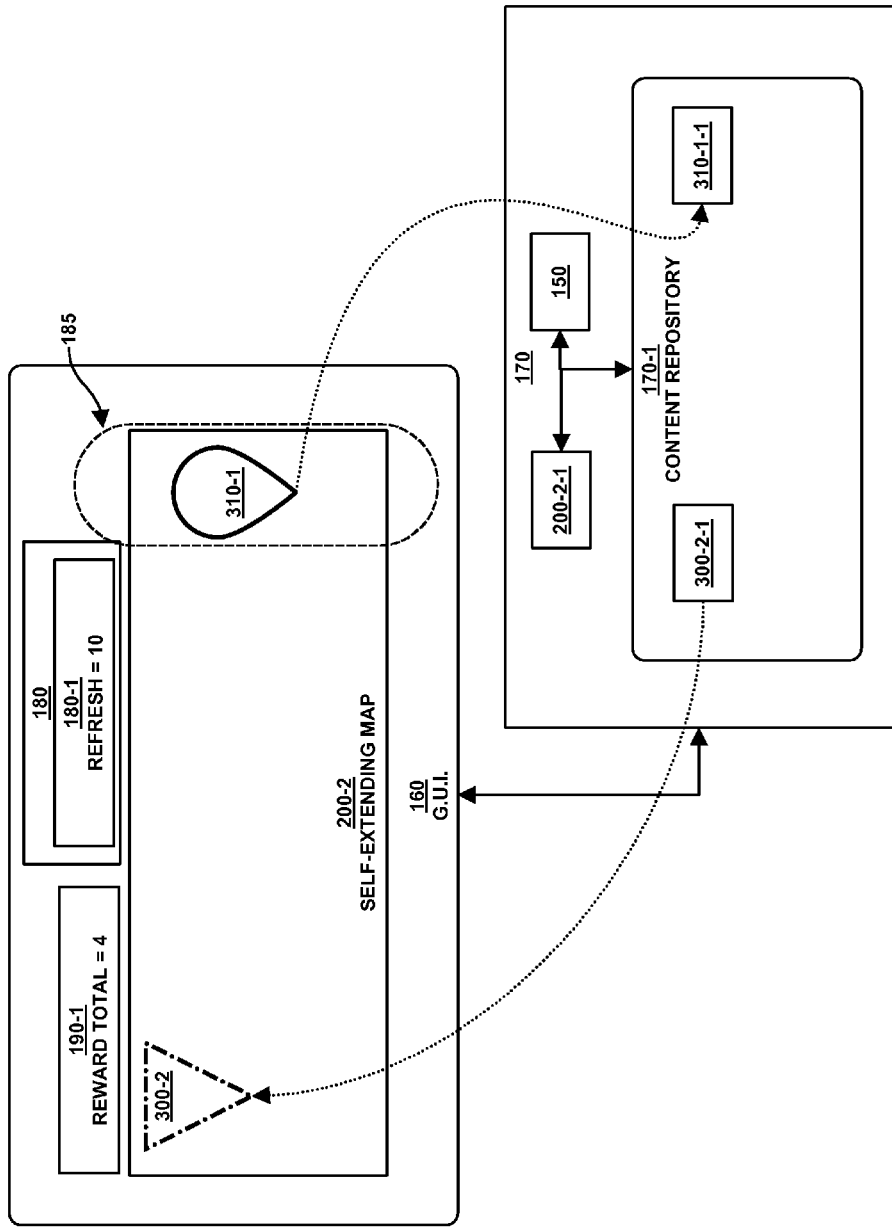
FIG. 2 is an example block diagram of a graphical user interface perspective view of a self-extending coordinate map displaying decayed user-generated content and content placed on a new portion of the self-extending coordinate map by another user according to embodiments herein.

FIG. 2 is an example block diagram of a graphical user interface 160 perspective view of a self-extending coordinate map 200-2 displaying decayed user-generated content 300-2 and content 310-1 placed on a new portion 185 of the self-extending coordinate map 200-2 by another user according to embodiments herein.

As time elapses from the creation time of the user-generated content 300-1, the Virtual Environment 150 applies a rate of decay to user-generated content 300-1 in order to create a second version 300-2-1 of the user-generated content. The Virtual Environment 150 stores the second version 300-2-1 of the user-generated content in the content repository 170-1 and transmits the second version 300-2-1 of the user-generated content so that the decayed (e.g. faded) user-generated content 300-2 is presented in the self-extending coordinate map 200-2 at the location selected by the user. The Virtual Environment 150 also sends data to display an updated reward total 190-1 for the user. The updated reward total 190-1 indicates that other users accessing the self-extending coordinate map have viewed and rated either the original version of the user-generated content 300-1 and the second version 300-2-1 of the user-generated content (i.e. the decayed version).

Additionally, in response to a second user's navigation in the self-extending coordinate map, the Virtual Environment 150 stores an updated version 200-2-1 of the self-extending coordinate map 200-2 which includes a new portion 185 within the self-extending coordinate map 200-2. The Virtual Environment 150 transmits the updated version 200-2-1 of the self-extending coordinate map 200-2 such that the graphical user interface 160 displays the self-extending coordinate map 200-2 with the new portion 185.

In addition, the Virtual Environment 150 stores a version 310-1-1 of content 310-1 received from the second user who created and placed the content 310-1 within the new portion 185. Upon receiving and storing the version 310-1-1 of the content 310-1 from the second user, the Virtual Environment 150 transmits data to display the second user's content 310-1 at the location in the self-extending coordinate map 200-2 selected by the second user.

Figure 3:
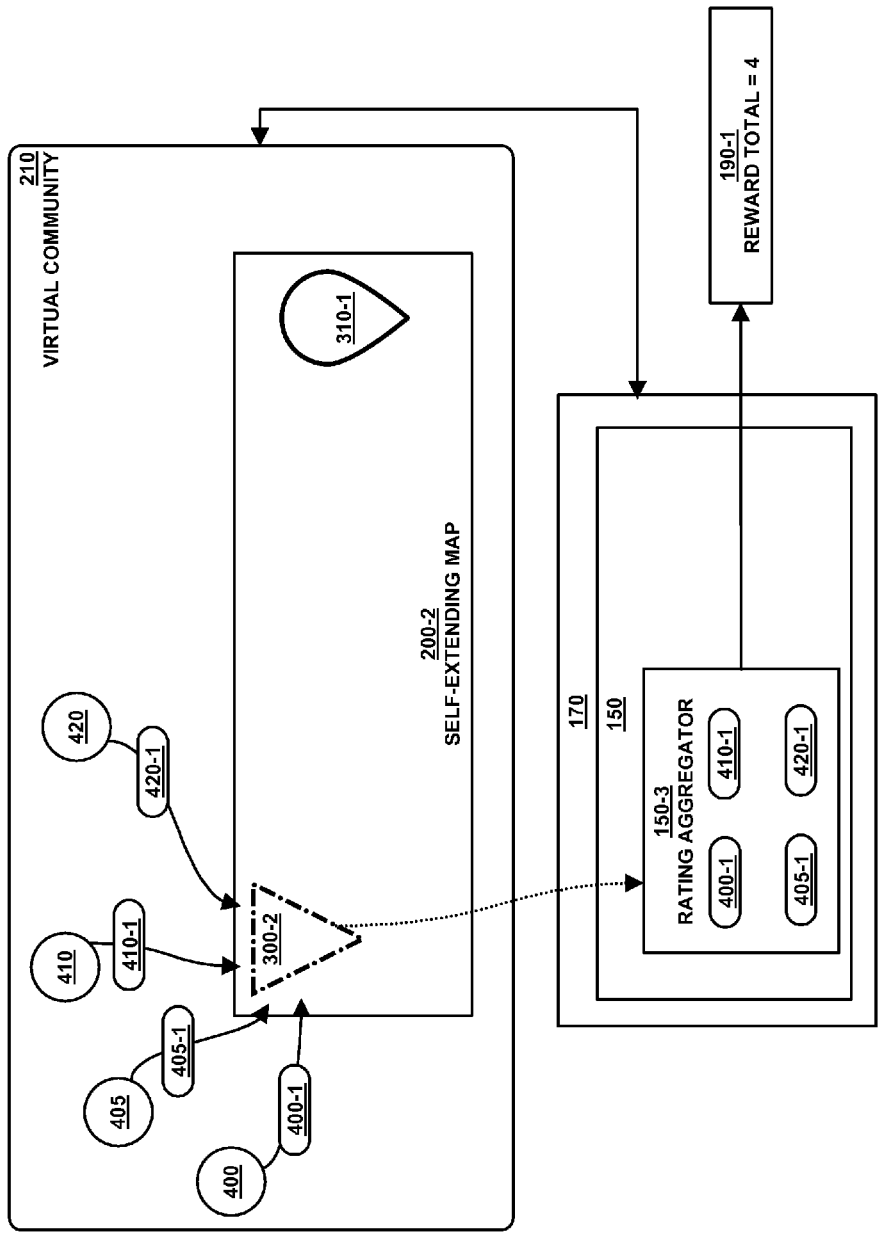
FIG. 3 is an example block diagram of multiple users in a Virtual Environment virtual community applying ratings to decayed user-generated content on a self-extending coordinate map according to embodiments herein.

FIG. 3 is an example block diagram of multiple users 400, 405, 410, 420 in a Virtual Environment virtual community 210 applying ratings 400-1, 405-1, 410-1, 420-1 to decayed user-generated content 300-2 on a self-extending coordinate map 200-2 according to embodiments herein.

From individual client systems, each of the multiple users 400, 405, 410, 420 can simultaneously access and view the self-extending coordinate map 200-2 in the virtual community 210 supported by the Virtual Environment 150. The Virtual Environment 150 provides each of the multiple users 400, 405, 410, 420 with the option to send a rating of (or send feedback about) the second version 300-2 of the user-generated content. For example, the Virtual Environment 150 defines various of levels of rating such as "cool," "alright," or "lame" that each user can select to apply to user-generated content. In another embodiment, that ratings can be selected from a scale of one to four stars—four stars signifying that the user submitting the rating highly approves of the content.

As the multiple users 400, 405, 410, 420 submits their respective ratings 400-1, 405-1, 410-1, 420-1 of the decayed user-generated content 300-2, the Virtual Environment 150 receives the ratings 400-1, 405-1, 410-1, 420-1 and processes the ratings 400-1, 405-1, 410-1, 420-1 in a rating aggregator 150-3. Based on the received ratings 400-1, 405-1, 410-1, 420-1, the Virtual Environment 150 can determine an updated award amount 190-1 for the user who initially created the content upon which the decayed user-generated content 300-2 is based.

Figure 4:
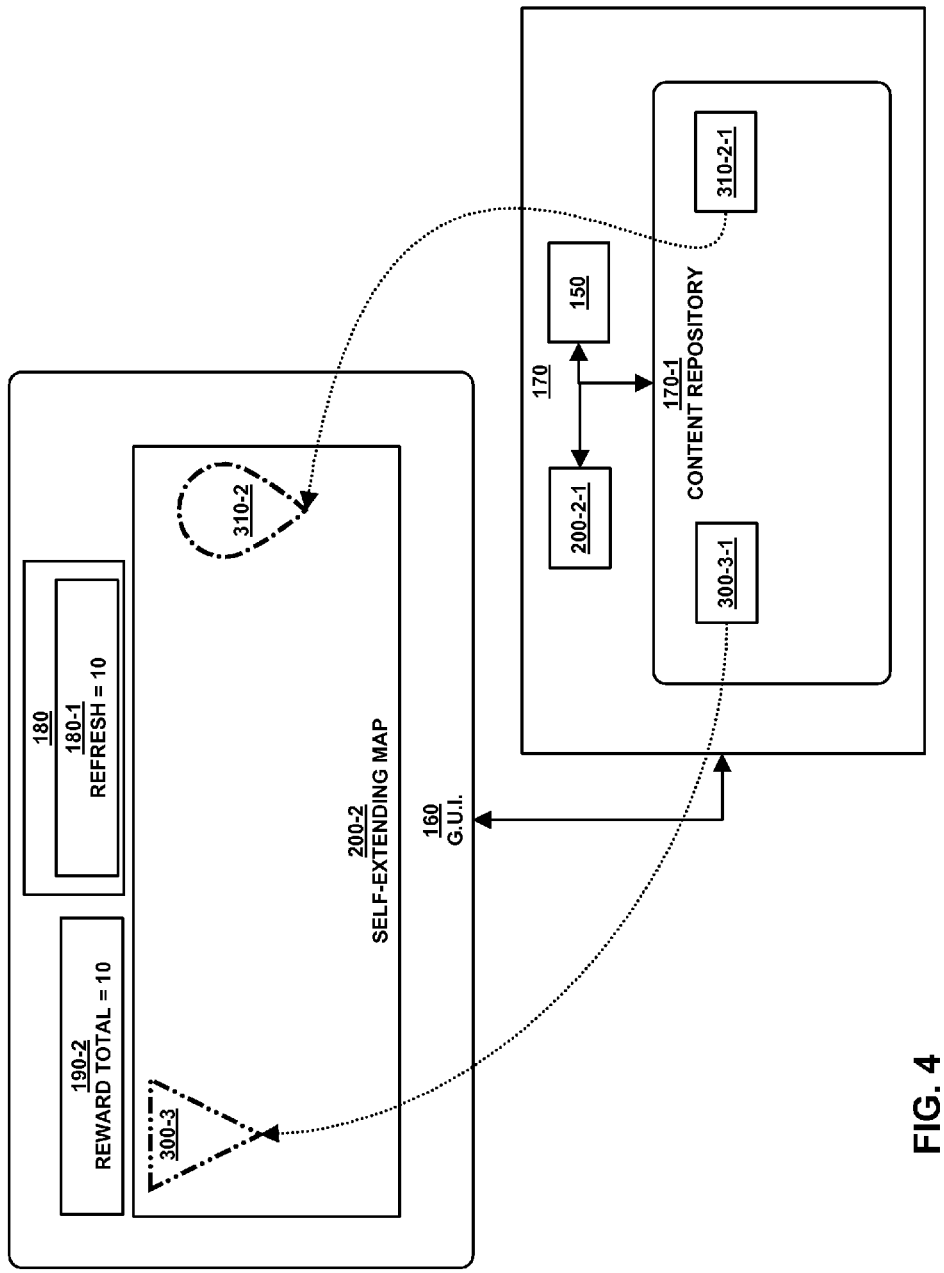
FIG. 4 is an example block diagram of a graphical user interface perspective view of a self-extending coordinate map displaying decayed user-generated content associated with two users according to embodiments herein.

FIG. 4 is an example block diagram of a graphical user interface 160 perspective view of a self-extending coordinate map displaying decayed user-generated content associated with two users according to embodiments herein.

As time continues to elapse from the creation time of the user-generated content 300-1, the Virtual Environment 150 continues to apply the rate of decay to the user-generated content 300-1 in order to create a third version 300-3-1 of the user-generated content. The third version 300-3-1 of the user-generated content is a further faded (i.e. less visible) version of the second version 300-2-1 of the user-generated content.

The Virtual Environment 150 stores the third version 300-3-1 of the user-generated content in the content repository 170-1 and transmits the third version 300-3-1 of the user-generated content so that the "even more decayed" (e.g. faded) user-generated content 300-3 is presented in the self-extending coordinate map 200-2 at the location selected by the user.

The Virtual Environment 150 also sends data to display a new reward total 190-2 for the user. The new reward total 190-2 indicates that other users accessing the self-extending coordinate map have viewed and rated third version 300-3-1 of the user-generated content. Thus, the user who submitted the content upon which the "even more decayed" user-generated content 300-3 is based has a new reward amount 190-2 that is equal to 10 (e.g. 10 units of virtual money). The Virtual Environment 150 offers a refresh feature 180-2 in the feature selector 180 that allows any user to restore decayed content to appear without any decay (or alteration).

Similarly, with regard to content 310-1 from the second user, the Virtual Environment 150 applies the rate of decay to the content 310-1 in order to create a second version 310-2-1 of the content which is a faded version of the content 310-1. The Virtual Environment 150 stores the second version 310-2-1 of the content in the content repository 170-1 and transmits the second version 310-2-1 of the content so that the decayed (e.g. faded) content 310-2 is presented in the self-extending coordinate map 200-2 at the location selected by the second user.

Figure 5:
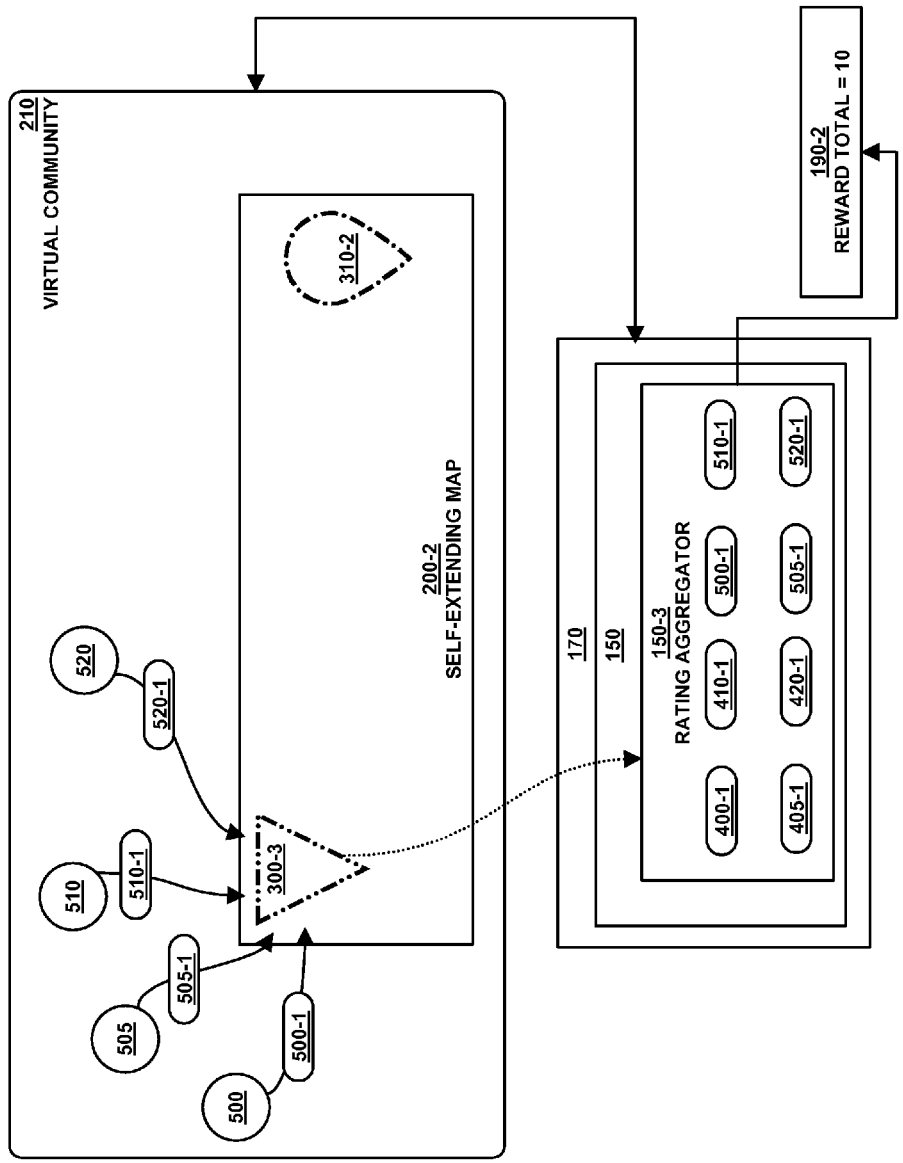
FIG. 5 is an example block diagram of multiple users in a Virtual Environment virtual community applying ratings to further decayed user-generated content on a self-extending coordinate map according to embodiments herein.

FIG. 5 is an example block diagram of multiple users 500, 505, 510, 520 in a Virtual Environment virtual community 210 applying ratings 500-1, 505-1, 510-1, 520-1 to further decayed user-generated content 300-3 on a self-extending coordinate map 200-2 according to embodiments herein.

During a period of time occurring after the first group of multiple users 400, 405, 410, 420 accessed the virtual community 210, a second set of multiple users 500, 505, 510, 520 can simultaneously access and view the self-extending coordinate map 200-2 in the virtual community 210 supported by the Virtual Environment 150. The Virtual Environment 150 provides each of the multiple users 500, 505, 510, 520 with the option to send a rating of (or send feedback about) the further decayed user-generated content 300-3.

As the multiple users 500, 505, 510, 520 submit their respective ratings 500-1, 505-1, 510-1, 520-1 of the further decayed user-generated content 300-3, the Virtual Environment 150 receives the ratings 500-1, 505-1, 510-1, 520-1 and processes the ratings 500-1, 505-1, 510-1, 520-1, along with the ratings 400-1, 405-1, 410-1, 420-1 from the first group of multiple users 400, 405, 410, 420, in a rating aggregator 150-3. Based on the received ratings 400-1, 405-1, 410-1, 420-1, 500-1, 505-1, 510-1, 520-1, the Virtual Environment 150 can determine a new award amount 190-2 for the user who initially created the content upon which the decayed user-generated content 300-3 is based.

Figure 6:
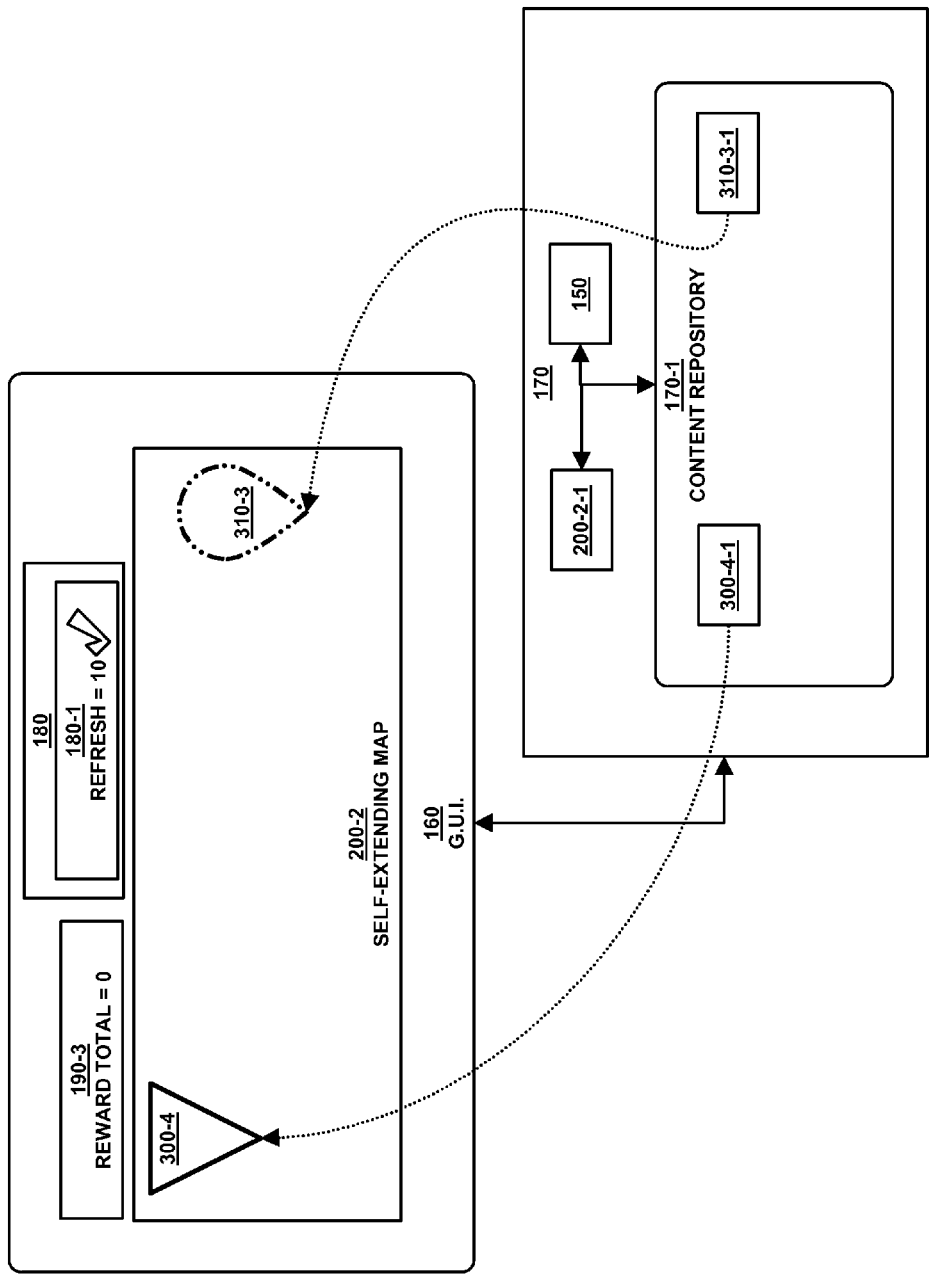
FIG. 6 is an example block diagram of a user obtaining access to a feature for refreshing decayed user-generated content on a self-extending coordinate map according to embodiments herein.

FIG. 6 is an example block diagram of a user obtaining access to a feature 180-1 for refreshing decayed user-generated content 300-3 on a self-extending coordinate map 200-2 according to embodiments herein.

The Virtual Environment 150 allows the user who submitted the content upon which decayed "even more decayed" user-generated content 300-3 is based to acquire access to the refresh feature 180-2 in exchange for 10 reward units. Upon selecting the refresh feature, the reward total 190-3 for the user is completely depleted and reset to an amount of 0.

In response to the user selecting the refresh feature 180-2, the Virtual Environment 150 creates and stores a refreshed version 300-4-1 of the user-generated content in the content repository 170-1. The Virtual Environment 150 then transmits the refreshed version 300-4-1 of the user-generated content so that the refreshed content 300-4 is presented in the self-extending coordinate map 200-2 at the location selected by the user. It is understood that the creation time for the content 300 is thereby reset to the moment in time when the refresh feature was selected by the user. Thus, starting from the reset creation time, the Virtual Environment 150 begins to apply the rate of decay to the refreshed content 300-4 to create successively decayed versions of the refreshed content 300-4.

As time continues to elapse from the creation time of content 310 created by the second user, the Virtual Environment 150 continues to apply the rate of decay to the content 310 in order to create a third version 310-3-1 of the content. The third version 310-3-1 of the content is a further faded (i.e. less visible) version of the second version 310-2-1 of the content created by the second user.

The Virtual Environment 150 stores the third version 310-3-1 of the content in the content repository 170-1 and transmits the third version 310-3-1 of the content so that the "even more decayed" (e.g. faded) user-generated content 310-3 is presented in the self-extending coordinate map 200-2 at the location selected by the second user.

Figure 7:
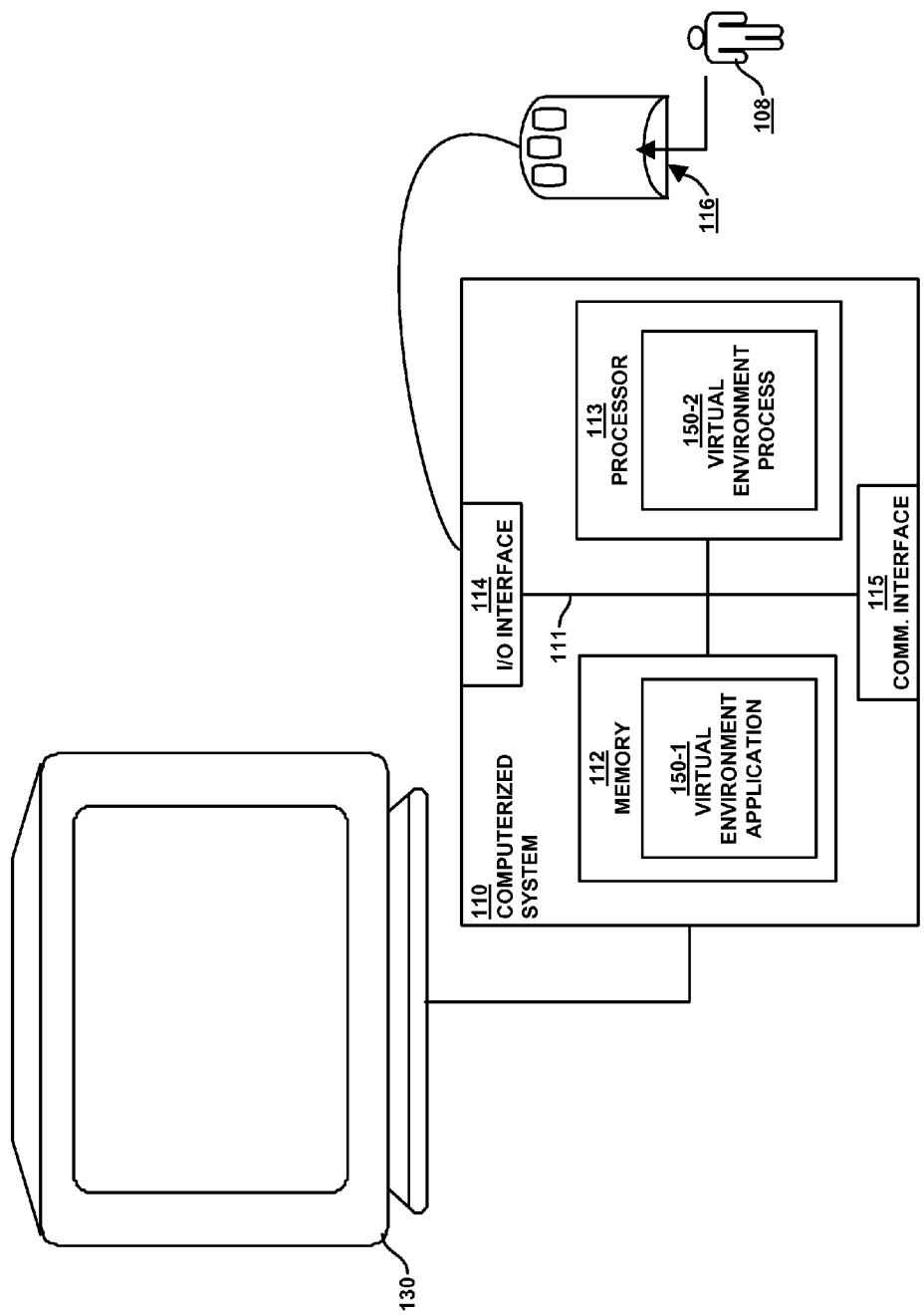
FIG. 7 is an example block diagram illustrating an architecture of a computer system that executes a Virtual Environment application and/or a Virtual Environment process according to embodiments herein.

FIG. 7 is an example block diagram illustrating an architecture of a computer system 110 that executes, runs, interprets, operates or otherwise performs a Virtual Environment application 150-1 and/or Virtual Environment process 150-2 (e.g. an executing version of a Virtual Environment 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network Environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Virtual Environment 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Virtual Environment application 150-1 and/or the Virtual Environment process 150-2 can be distributed and executed in multiple nodes in a computer network Environment or performed locally on a single computer.

During operation of the computer system 110, the processor 113 accesses the memory system 112 via the interconnect 111 in order to launch, run, execute, interpret or otherwise perform the logic instructions of the Virtual Environment application 150-1. Execution of the Virtual Environment application 150-1 in this manner produces the Virtual Environment process 150-2. In other words, the Virtual Environment process 150-2 represents one or more portions or runtime instances of the Virtual Environment application 150-1 (or the entire application 150-1) performing or executing within or upon the processor 113 in the computerized device 110 at runtime.

The Virtual Environment application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Virtual Environment application 150-1 can be executed on a remotely accessible computerized device via the communication interface 115.

Figure 8:
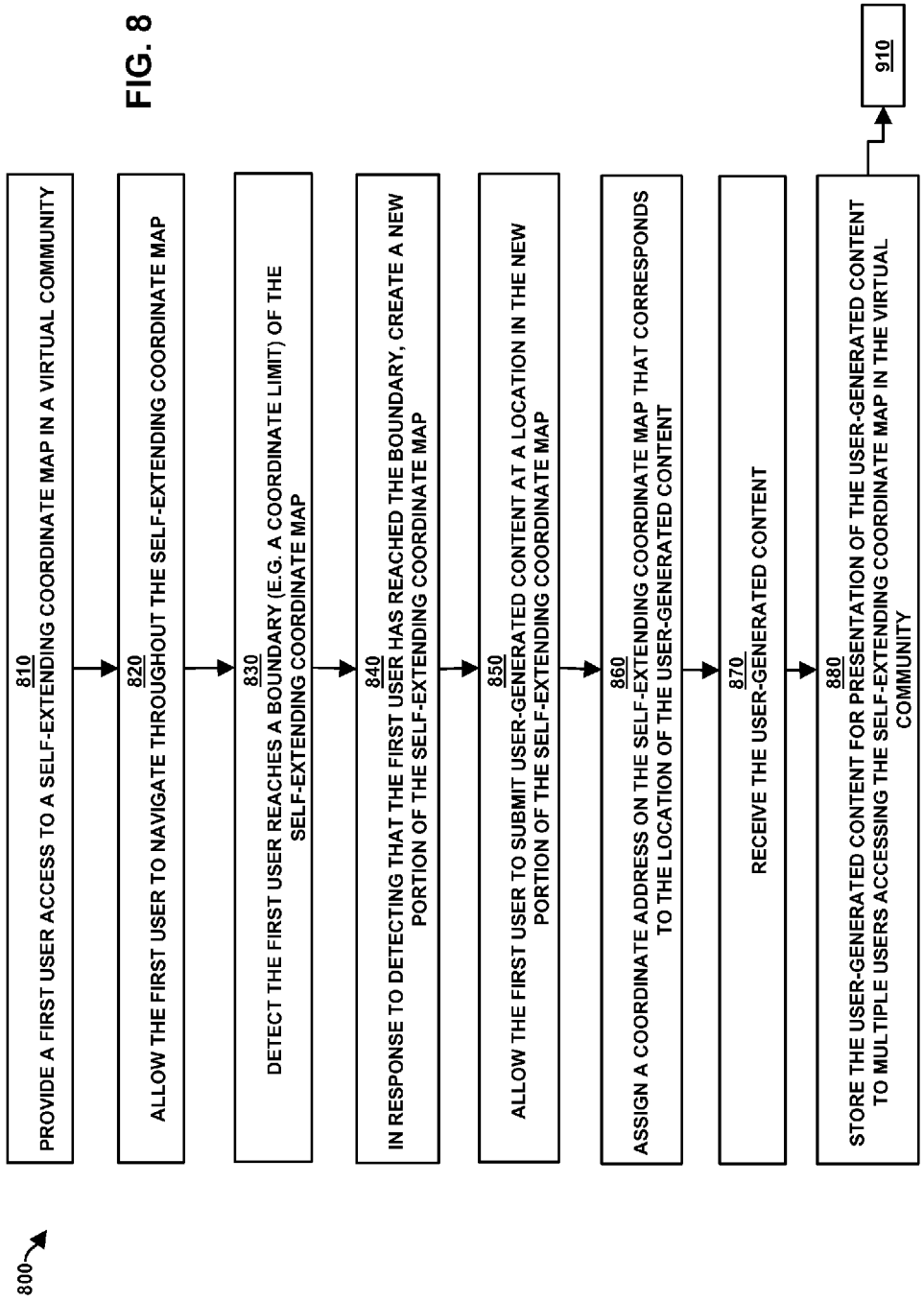
FIG. 8 is a flowchart of an example of processing steps performed by the Virtual Environment to store user-generated content that a first user submits to a location in a new portion of a self-extending coordinate map according to embodiments herein.
Figure 9:
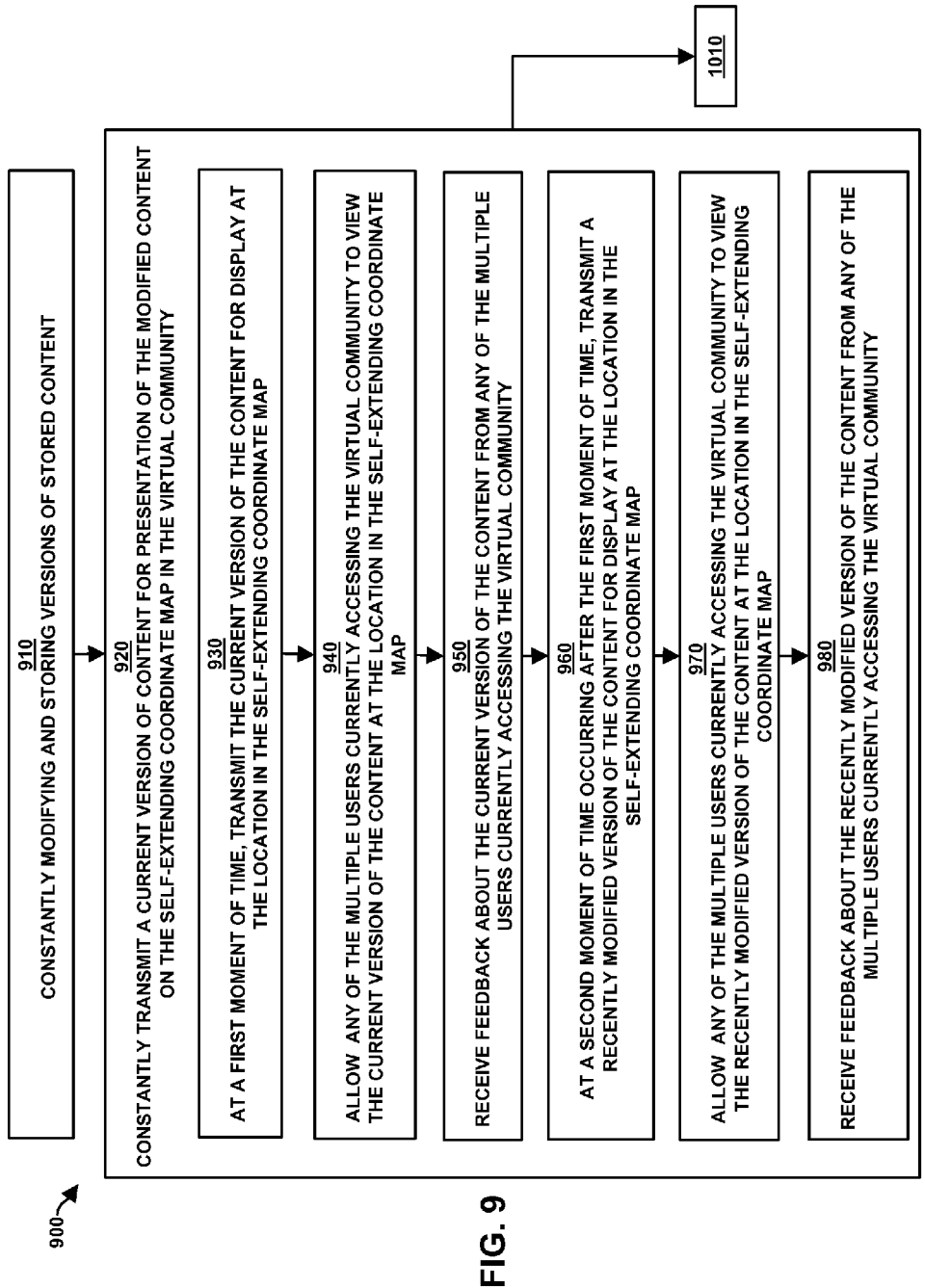
FIG. 9 is a flowchart of an example of processing steps performed by the Virtual Environment to receive feedback from multiple users of a virtual community with regards to various versions of content submitted by a user according to embodiments herein.
Figure 10:
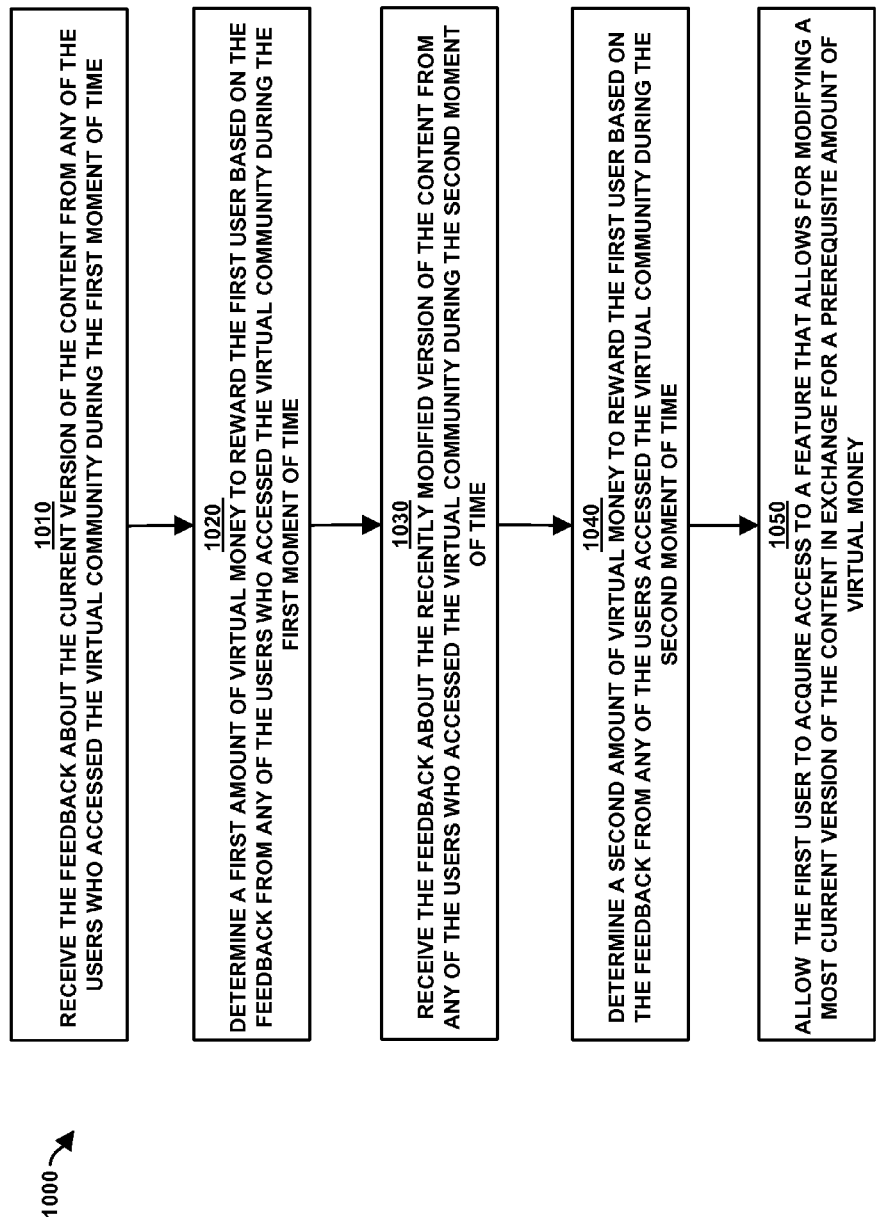
FIG. 10 is a flowchart of an example of processing steps performed by the Virtual Environment to determine an amount of virtual money to reward a user based on feedback from multiple users in a virtual community according to embodiments herein.

FIG. 8 through FIG. 10 illustrate various embodiment of the Virtual Environment 150. The rectangular elements in flowcharts 800, 900, 1000 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 800, 900, 1000 do not necessarily depict the syntax of any particular programming language. Rather, flowcharts 800, 900, 1000 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 8 is a flowchart 800 of an example of processing steps performed by the Virtual Environment 150 to store user-generated content that a first user submits to a location in a new portion of a self-extending coordinate map according to embodiments herein.

At step 810, the Virtual Environment 150 provides a first user access to a self-extending coordinate map in a virtual community.

At step 820, the Virtual Environment 150 allows the first user to navigate throughout the self-extending coordinate map.

At step 830, the Virtual Environment 150 detects the first user reaches a boundary (e.g. a coordinate limit) of the self-extending coordinate map.

At step 840, in response to detecting that the first user has reached the boundary, the Virtual Environment 150 creates a new portion of the self-extending coordinate map.

At step 850, the Virtual Environment 150 allows the first user to submit user-generated content at a location in the new portion of the self-extending coordinate map.

At step 860, the Virtual Environment 150 assigns a coordinate address on the self-extending coordinate map that corresponds to the location of the user-generated content.

At step 870, the Virtual Environment 150 receives the user-generated content.

At step 880, the Virtual Environment 150 stores the user-generated content for presentation of the user-generated content to multiple users accessing the self-extending coordinate map in the virtual community.

FIG. 9 is a flowchart 900 of an example of processing steps performed by the Virtual Environment 150 to receive feedback from multiple users of a virtual community with regards to various versions of content submitted by a user according to embodiments herein.

At step 910, the Virtual Environment 150 the constantly (e.g. continually) modifies and stores a version of stored content At step 920, the Virtual Environment 150 constantly transmits a current version of content for presentation of the modified content on the self-extending coordinate map in the virtual community.

At step 930, at a first moment of time, the Virtual Environment 150 transmits the current version of the content for display at the location in the self-extending coordinate map.

At step 940, the Virtual Environment 150 allows any of the multiple users currently accessing the virtual community to view the current version of the content at the location in the self-extending coordinate map.

At step 950, the Virtual Environment 150 receives feedback (e.g. ratings) about the current version of the content from any of the multiple users currently accessing the virtual community.

At step 960, at a second moment of time occurring after the first moment of time, the Virtual Environment 150 transmits a recently modified version of the content for display at the location in the self-extending coordinate map.

At step 970, the Virtual Environment 150 allows any of the multiple users currently accessing the virtual community to view the recently modified version of the content at the location in the self-extending coordinate map.

At step 980, the Virtual Environment 150 receives feedback about the recently modified version of the content from any of the multiple users currently accessing the virtual community.

FIG. 10 is a flowchart 1000 of an example of processing steps performed by the Virtual Environment 150 to determine an amount of virtual money to reward a user based on feedback from multiple users in a virtual community according to embodiments herein.

At step 1010, the Virtual Environment 150 receives the feedback about the current version of the content from any of the users who accessed the virtual community during the first moment of time.

At step 1020, the Virtual Environment 150 determines a first amount of virtual money to reward the first user based on the feedback from any of the users who accessed the virtual community during the first moment of time.

At step 1030, the Virtual Environment 150 receives the feedback about the recently modified version of the content from any of the users who accessed the virtual community during the second moment of time.

At step 1040, the Virtual Environment 150 determines a second amount of virtual money to reward the first user based on the feedback from any of the users accessed the virtual community during the second moment of time.

At step 1050, the Virtual Environment 150 allows the first user to acquire access to a feature that allows for modifying a most current version of the content in exchange for a prerequisite amount of virtual money.

The methods and systems described herein are not limited to a particular hardware or software configuration, and may find applicability in many computing or processing Environment s. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked Environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed Environment (s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   receiving content associated with a user;
   storing the content for presentation to a plurality of additional users;
   transmitting the content for presentation to the plurality of additional users;
   receiving a plurality of ratings from at least some of the plurality of additional users, wherein receiving the plurality of ratings comprises:
      receiving at least one rating with respect to a first faded version of the content from at least one first additional user from the plurality of additional users, wherein the first faded version comprises the content being faded to be less visible according to a rate of decay as a first unit of time elapses from a creation time associated with the content;
      receiving a second rating with respect to a second faded version of the content from at least one second additional user from the plurality of additional users, wherein the second faded version comprises the first faded version of the content being faded to be less visible according to the rate of decay as a second unit of time elapses after the first unit of time;
   determining an aggregate rating of the content by aggregating the plurality of ratings from the at least some additional users including at least the first rating and the second rating; and
   based on determining that the aggregate rating is greater than or equal to a threshold rating, granting an amount of reward to the user, wherein the amount of reward is applicable towards the user obtaining at least one feature that allows for modifying the content.

2. The method as in claim 1, wherein receiving content associated with the user includes receiving user-generated content; and wherein storing the content for presentation to the plurality of additional users includes:
  storing the user-generated content for presentation on a self-extending coordinate map; and
  assigning the user-generated content to at least one coordinate address on the self-extending coordinate map, the at least one coordinate address corresponding to a location for the user-generated content selected by the user.

3. The method as in claim 2, further comprising:
  providing access to at least one additional user from the plurality of additional users allowing the at least one additional user to browse the self-extending coordinate map; and
  upon detecting the at least one additional user navigating to an area of the self-extending coordinate map that is proximate to the at least one coordinate address assigned to the user-generated content, transmitting data to allow the at least one additional user to view the user-generated content at the assigned at least one coordinate address.

4. The method as in claim 3, wherein storing the content for presentation on the self-extending coordinate map includes:
  defining the self-extending coordinate map as a two-dimensional coordinate map;
  defining the self-extending coordinate map to extend according to at least one new coordinate limit in response to detecting the at least one additional user navigating the self-extending coordinate map up to at least one current coordinate limit of the self-extending coordinate map;
  creating a new portion of the self-extending coordinate map, the new portion mapped by the at least one new coordinate limit, the new portion including at least one new coordinate address capable of being assigned to new content generated by any user; and
  updating a stored representation of the self-extending coordinate map to include the new portion in addition to existing stored portions of the self-extending coordinate map.

5. The method as in claim 1, wherein granting the amount of reward to the user includes:
  upon the user obtaining a prerequisite amount of reward, allowing the user to choose a preservation feature, the preservation feature allowing for at least one of:
    (i) decreasing the rate of decay applied to the content for the first unit of time;
    (ii) refreshing a current version of the content to create a new version of the content, the new version of the content representing the content at the creation time;
    (iii) terminating the rate of decay applied to the content for the second unit of time; and
    (iv) prohibiting the plurality of additional users from modifying the current version of the content for a third unit of time.

6. The method as in claim 1, comprising:
  receiving a rule suggestion from at least one of the plurality of additional users;
  receiving a respective rule response from each of the plurality of additional users, the rule response comprising one of:
    (i) an approval of a rule described in the rule suggestion;
    (ii) a disapproval of the rule described in the rule suggestion; and
    (iii) a modified rule based on the rule described in the rule suggestion; and
  upon receiving a threshold amount of approvals associated with one of the rule and the modified rule, creating a community rule based on one of the rule and the modified rule, the community rule changing a required level of access to the at least one feature that allows for modifying the content.

7. The method as in claim 1, wherein storing the content for presentation to the plurality of additional users includes:
  modifying the content to create a first modified version of the content;
  storing the first modified version of the content for presentation to a first group of multiple users in a virtual community;
  after storing the first modified version of the content, modifying the first modified version of the content to create a second modified version of the content; and
  storing the second modified version of the content for presentation to a second group of multiple users in the virtual community;
    wherein transmitting the content for presentation to the plurality of additional users includes:
      at a first moment in time, transmitting data to present the first modified version of the content in the virtual community;
      at a second moment in time, transmitting data to present the second modified version of the content in the virtual community, the second moment in time occurring after the first moment in time; and
    wherein receiving the plurality of ratings from the at least some of the plurality of additional users includes:
      receiving at least one indication of feedback about the first modified version of the content from any user within the first group of multiple users; and
      receiving at least one indication of feedback about the second modified version of the content from any user within the second group of multiple users.

8. The method as in claim 7, further comprising:
  upon receiving the at least one indication of feedback about the first modified version of the content, processing the at least one indication of feedback about the first modified of the content to determine a first amount of virtual money to reward the user, the user belonging to the virtual community;
  upon receiving the at least one indication of feedback about the second modified version of the content, processing the at least one indication of feedback about the second modified version of the content to determine a second amount of virtual money to reward the user; and
  in exchange for a prerequisite amount of virtual money, allowing the user to acquire the at least one feature that allows for modifying a current version of the content.

9. The method of claim 1, wherein aggregating the plurality of ratings from the plurality of additional users comprises:
  determining that a first subset of the plurality of ratings comprises a plurality of positive ratings;
  determining that a second subset of the plurality of ratings comprises a plurality of negative ratings; and
  determining that the first subset includes more ratings than the second subset.

10. The method of claim 1, wherein determining the aggregate rating of the content comprises aggregating the plurality of ratings from the at least some additional users during a period of time and further comprising:
  determining an additional aggregate rating of the content by aggregating an additional plurality of ratings from at least some of the plurality of additional users during an additional period of time; and based on determining that the aggregate rating is greater than or equal to an additional threshold rating greater than the threshold rating, granting an additional amount of reward to the user greater than the amount of reward, the additional amount of reward applicable towards the user obtaining the at least one feature that allows for modifying the content.

11. A non-transitory computer readable medium comprising executable instructions encoded thereon operable on a computerized device to perform processing comprising:
  instructions for receiving content associated with a user;
  instructions for storing the content for presentation to a plurality of additional users;
  instructions for transmitting the content for presentation to the plurality of additional users;
  instructions for receiving a plurality of ratings from at least some of the plurality of additional users, wherein receiving the plurality of ratings comprises:
    receiving at least one rating with respect to a first faded version of the content from at least one first additional user from the plurality of additional users, wherein the first faded version comprises the content being faded to be less visible according to a rate of decay as a first unit of time elapses from a creation time associated with the content;
    receiving a second rating with respect to a second faded version of the content from at least one second additional user from the plurality of additional users, wherein the second faded version comprises the first faded version of the content being faded to be less visible according to the rate of decay as a second unit of time elapses after the first unit of time;
  instructions for determining an aggregate rating of the content by aggregating the plurality of ratings from the at least some additional users including at least the first rating and the second rating; and
  instructions for based on determining that the aggregate rating is greater than or equal to a threshold rating, granting an amount of reward to the user, wherein the amount of reward is applicable towards the user obtaining at least one feature that allows for modifying the content.

12. The computer readable medium as in claim 11, wherein the instructions for receiving content associated with the user include receiving user-generated content; and
  wherein the instructions for storing the content for presentation to the plurality of additional users include:
  instructions for storing the user-generated content for presentation on a self-extending coordinate map; and
  instructions for assigning the user-generated content to at least one coordinate address on the self-extending coordinate map, the at least one coordinate address corresponding to a location for the user-generated content selected by the user.

13. The computer readable medium as in claim 12, further comprising:
  instructions for providing the providing access to at least one additional user from the plurality of additional users allowing the at least one additional user to browse the self-extending coordinate map;
  instructions for detecting the at least one additional user navigating to an area of the self-extending coordinate map that is proximate to the at least one coordinate address assigned to the user-generated content;
  instructions for transmitting data to allow the at least one additional user to view the user-generated content at the assigned at least one coordinate address upon detecting the at least one additional user navigating to the area of the self-extending coordinate map.

14. The computer readable medium as in claim 13, wherein the instructions for storing the content for presentation on the self-extending coordinate map include:
  instructions for defining the self-extending coordinate map as a two-dimensional coordinate map;
  instructions for defining the self-extending coordinate map to extend according to at least one new coordinate limit in response to detecting the at least one additional user navigating the self-extending coordinate map up to at least one current coordinate limit of the self-extending coordinate map;
  instructions for creating a new portion of the self-extending coordinate map, the new portion mapped by the at least one new coordinate limit, the new portion including at least one new coordinate address capable of being assigned to new content generated by any user; and
  instructions for updating a stored representation of the self-extending coordinate map to include the new portion in addition to existing stored portions of the self-extending coordinate map.

15. The computer readable medium as in claim 11, wherein the instructions for granting the amount of reward to the user include:
  instructions for allowing the user to choose a preservation feature upon the user obtaining a prerequisite amount of reward, the preservation feature allowing for at least one of:
    (i) decreasing the rate of decay applied to the content for the first unit amount of time;
    (ii) refreshing a current version of the content to create a new version of the content, the new version of the content representing the content at the creation time;
    (iii) terminating the rate of decay applied to the content for the second unit of time; and
    (iv) prohibiting the plurality of additional users from modifying the current version of the content for a third unit of time.

16. A computer system comprising:
  a processor;
  a memory unit that stores instructions associated with an application executable by the processor; and
  an interconnect coupling the processor and the memory unit;
  wherein the processor is configured to execute the application and perform operations, the operations comprising:
    receiving content associated with a user;
    storing the content for presentation to a plurality of additional users;
    transmitting the content for presentation to the plurality of additional users;
    receiving a plurality of ratings from at least some of the plurality of additional users, wherein receiving the plurality of ratings comprises:
      receiving at least one rating with respect to a first faded version of the content from at least one first additional user from the plurality of additional users, wherein the first faded version comprises the content being faded to be less visible according to a rate of decay as a first unit of time elapses from a creation time associated with the content;
      receiving a second rating with respect to a second faded version of the content from at least one second additional user from the plurality of additional users, wherein the second faded version comprises the first faded version of the content being faded to be less visible according to the rate of decay as a second unit of time elapses after the first unit of time;

determining an aggregate rating of the content by aggregating the plurality of ratings from the at least some additional users including at least the first rating and the second rating; and based on determining that the aggregate rating is greater than or equal to a threshold rating, granting an amount of reward to the user, wherein the amount of reward is applicable towards the user obtaining at least one feature that allows for modifying the content.

17. A method comprising:

receiving content associated with a user;

storing the content for presentation to a virtual community, wherein the virtual community includes the user;

modifying the content to create a first modified version of the content for presentation to a first group of users in the virtual community;

receiving at least one first indication of feedback about the first modified version of the content from at least one of the first group of users;

processing the at least one first indication of feedback to determine a first amount of virtual money to reward the user;

modifying the first modified version of the content to create a second modified version of the content for presentation to a second group of users in the virtual community;

receiving at least one second indication of feedback about the second modified version of the content from at least one of the second group of users;

processing the at least one second indication of feedback to determine a second amount of virtual money to reward the user;

determining an aggregate rating of the content by aggregating a plurality of indications of feedback about the content received from at least some of the virtual community; and granting an amount of reward to the user in exchange for a prerequisite amount of virtual money based on determining that the aggregate rating is greater than or equal to a threshold rating, wherein the amount of reward is applicable towards the user obtaining at least one feature that allows for modifying a current version of the content.

* * * * *